(12) United States Patent
Gabbianelli et al.

(10) Patent No.: US 9,340,229 B2
(45) Date of Patent: May 17, 2016

(54) CRADLE ASSEMBLY FOR A VEHICLE

(71) Applicants: Frank Gabbianelli, Birmingham, MI (US); James Byrne, II, Shelby Township, MI (US); Julie Anne Schoenherr, Washington Township, MI (US)

(72) Inventors: Frank Gabbianelli, Birmingham, MI (US); James Byrne, II, Shelby Township, MI (US); Julie Anne Schoenherr, Washington Township, MI (US)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 14/402,852

(22) PCT Filed: May 21, 2013

(86) PCT No.: PCT/US2013/041961
§ 371 (c)(1),
(2) Date: Nov. 21, 2014

(87) PCT Pub. No.: WO2013/177120
PCT Pub. Date: Nov. 28, 2013

(65) Prior Publication Data
US 2015/0107932 A1    Apr. 23, 2015

Related U.S. Application Data

(60) Provisional application No. 61/649,582, filed on May 21, 2012.

(51) Int. Cl.
*B62D 21/11* (2006.01)
*B60K 5/12* (2006.01)

(52) U.S. Cl.
CPC .............. *B62D 21/11* (2013.01); *B60K 5/1216* (2013.01)

(58) Field of Classification Search
CPC ........ B62D 21/00; B62D 21/11; B62D 25/08; B60K 5/1216
USPC .................. 296/204, 203.01; 280/0.781, 785, 280/124.109; 180/299, 311, 312
See application file for complete search history.

(56) References Cited

U.S. PATENT DOCUMENTS 2,708,003 A * 5/1955 Nallinger ................. B60G 3/20
                                                    180/295
2,814,352 A * 11/1957 Muller ................. B60K 5/1216
                                                    180/12

(Continued)

OTHER PUBLICATIONS

Miller, Mercedes-Benz Ponton Restroation Projects, mbzponton, May 18, 2003 and Jan. 2, 2005, [retrieved on Sep. 27, 2013 from ISR/WO], retrieved from Internet: URL: http://www.mbzponton.org/pax058/people/savidan/savidan.htm.

*Primary Examiner* — Ruth Ilan
(74) *Attorney, Agent, or Firm* — Dickinson Wright PLLC

(57) ABSTRACT

A sub-frame assembly for attachment to a unibody of a vehicle and for supporting at least one vehicular component is provided. The sub-frame assembly includes a pair of longitudinal members which are spaced from one another in a lateral direction and extend in a longitudinal direction between first and second ends. The longitudinal members at least partially converge towards one another from the first ends to the second ends such that the second ends are closer to one another than the first ends. A cross-member is coupled with and extends laterally between the longitudinal members. Each of the longitudinal members and the cross-member has a single and no more than one body mount for connection with the unibody of the vehicle such that the sub-frame assembly has exactly three body mounts in total.

15 Claims, 3 Drawing Sheets

(56) References Cited

U.S. PATENT DOCUMENTS

| | | | | |
|---|---|---|---|---|
| 2,935,149 | A | * | 5/1960 | Nallinger ............. B60K 5/1216 180/295 |
| 3,075,601 | A | * | 1/1963 | Muller ................. B60K 5/1216 180/295 |
| 5,096,010 | A | * | 3/1992 | Ojala et al. ................... 180/68.3 |
| 5,862,877 | A | * | 1/1999 | Horton et al. ................. 180/312 |
| 5,899,498 | A | | 5/1999 | Horton |
| 6,109,654 | A | * | 8/2000 | Yamamoto et al. ........... 280/784 |
| 6,428,046 | B1 | * | 8/2002 | Kocer et al. .................... 280/781 |
| 6,679,523 | B2 | * | 1/2004 | Yamamoto et al. ........... 280/785 |
| 6,739,624 | B2 | * | 5/2004 | Barber et al. ................. 280/781 |
| 7,857,349 | B2 | * | 12/2010 | Fujiki et al. ................... 280/785 |
| 2004/0124034 | A1 | * | 7/2004 | Komatsu et al. .............. 180/312 |
| 2006/0284449 | A1 | * | 12/2006 | Miyahara ...................... 296/204 |
| 2011/0308877 | A1 | * | 12/2011 | Hiruma ........................ 180/299 |
| 2013/0081897 | A1 | * | 4/2013 | Dandekar et al. ............. 180/291 |

* cited by examiner

CRADLE ASSEMBLY FOR A VEHICLE

CROSS REFERENCE TO RELATED APPLICATIONS

This U.S. National Stage Patent Application claims priority to PCT International Application No. PCT/US2013/041961 filed May 21, 2013, entitled "Cradle Assembly For A Vehicle" which claims the benefit of U.S. Provisional Patent Application Ser. No. 61/649,582, entitled "Cradle Assembly For A Vehicle", filed May 21, 2012, the entire disclosures of the applications being considered part of the disclosure of this application, and hereby incorporated by reference.

BACKGROUND OF THE INVENTION

1. Field of the Invention

The present invention relates generally to vehicle chassis and more particularly to sub-frame, or cradle, assemblies.

2. Related Art

Vehicles with a unibody design typically include a body and frame which are connected together as a single unit (hereinafter referred to as a "unibody") and serve as the main structure or chassis of the vehicle and to which all other components are attached. Often, one or more sub-frames, or carrier assemblies, are attached to the unibody to support different vehicular components including, among other things, a pair of suspension assemblies, an engine, a transmission, a differential, etc.

One known type of sub-frame assembly for a vehicle with a unibody design is shown in FIG. 1. As shown, this sub-frame assembly includes a pair of longitudinal members, each of which extends through an arcuate shape and a cross-member which extends between and interconnects the longitudinal members. The cross-member of this sub-frame assembly is attached approximately at the longitudinal midpoints of the longitudinal members. As also shown, each end of each of the longitudinal members has a body mount for attachment to the vehicle's unibody. The cross-member does not include any body mounts, and thus, this type of sub-frame assembly includes a total of four body mounts, and those body mounts are arranged in a generally rectangular pattern. Other known carrier assemblies have more than four body mounts.

SUMMARY OF THE INVENTION

According to one aspect of the present invention, a sub-frame assembly for attachment to a unibody of a vehicle and for supporting at least one vehicular component is provided. The sub-frame assembly includes a pair of longitudinal members which are spaced from one another in a lateral direction and extend in a longitudinal direction between first and second ends. The sub-frame assembly also has a cross-member which extends laterally between the longitudinal members. The sub-frame assembly has exactly three body mounts in total for connection with the unibody of the vehicle. Because the sub-frame assembly has three, rather than four or more, body mounts, it is lighter and easier to handle than other known sub-frame assemblies. The sub-frame assembly also may be more quickly and cost effectively attached to the unibody because only three, rather than four or more, fasteners are required. Even further, removal and replacement of the sub-frame assembly is easier because it only has three body mounts.

According to another aspect of the present invention, each of the longitudinal members and the cross-member has a single and no more than one body mount for connection with the unibody of the vehicle such that the sub-frame assembly has exactly three body mounts in total.

According to yet another aspect of the present invention, the three body mounts of the sub-frame assembly are arranged in a generally triangular pattern. This arrangement has been found to provide the sub-frame assembly with similar or greater strength and durability as compared to other known sub-frame assemblies with four or more body mounts.

According to still another aspect of the present invention, each of the body mounts includes a generally cylindrical sleeve which extends between aligned openings in the longitudinal members and the cross-member.

According to a further aspect of the present invention, the body mounts on the longitudinal members are disposed adjacent the first ends of the longitudinal members, and the body mount on the cross-member is disposed approximately at a lateral midpoint of the cross-member.

According to still a further aspect of the present invention, a plurality of link brackets are coupled to the longitudinal members for supporting at least one suspension component, such as a control arm.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
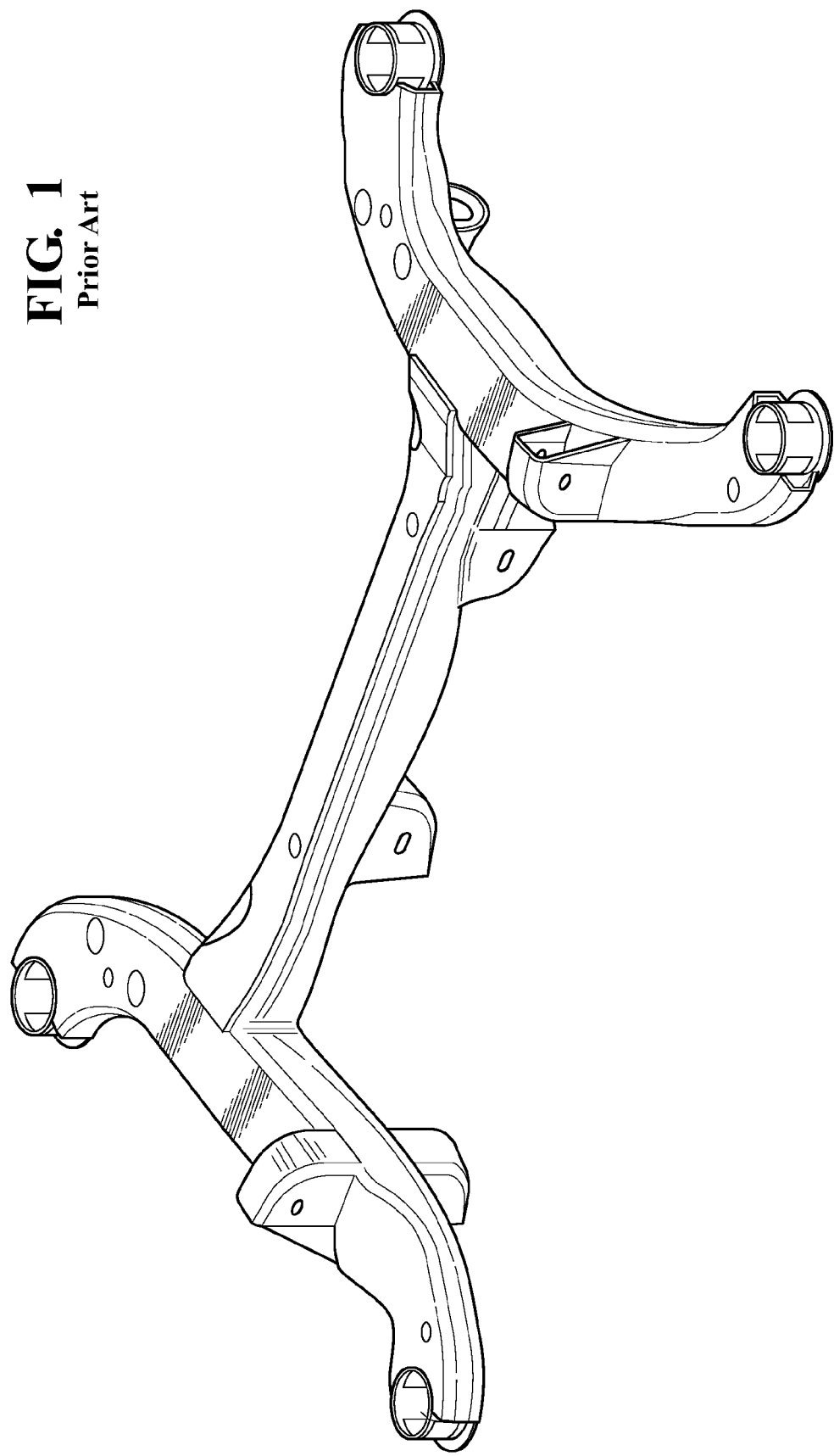
FIG. 1 is a perspective and elevation view of one known type of cradle assembly.
Figure 2:
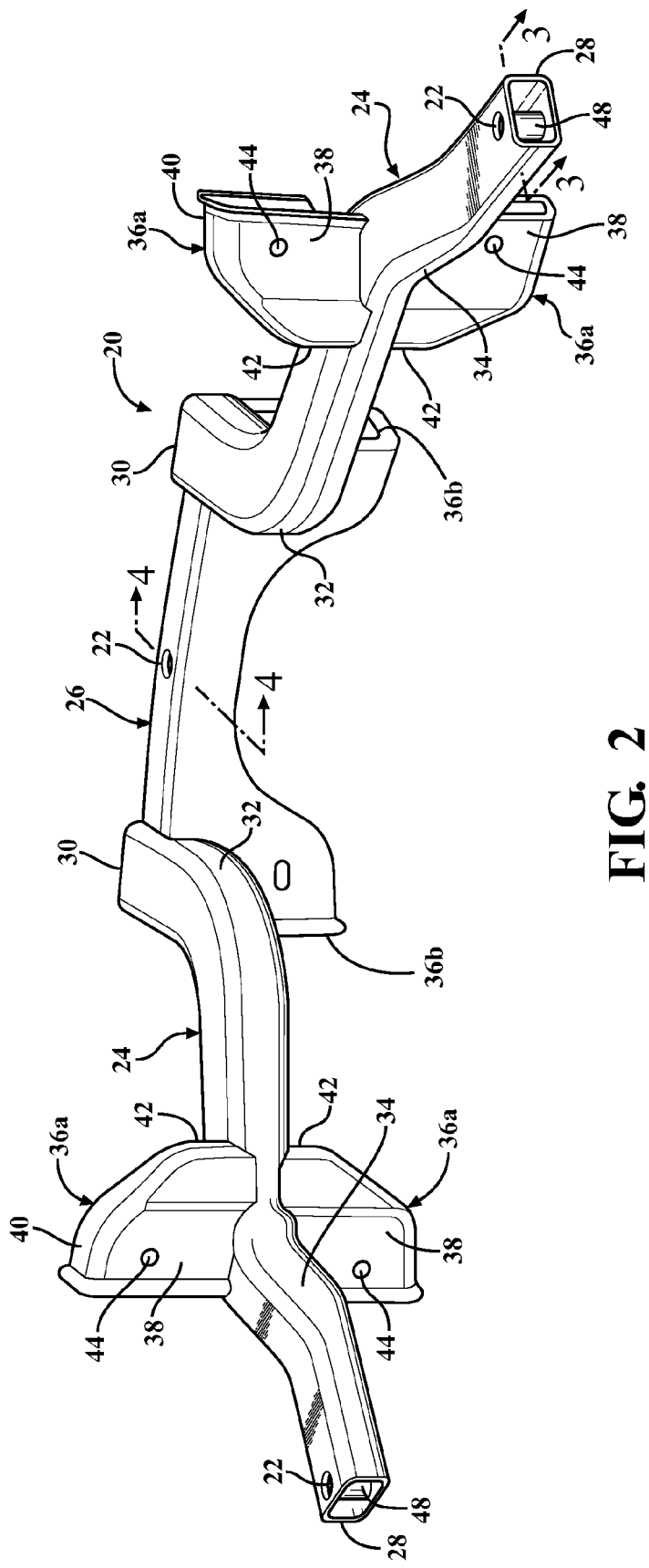
FIG. 2 is a perspective and elevation view of an exemplary cradle assembly constructed according to one aspect of the present invention.

Referring to FIG. 2, an exemplary embodiment of a sub-frame assembly 20, or cradle assembly, for a vehicle having a unibody design (i.e., a vehicle that has a frame and body formed as a single unit which is hereinafter referred to as a "unibody") is generally shown. As will be discussed in further detail below, the exemplary sub-frame assembly 20 includes exactly three body mounts 22 which are spaced from one another for coupling the exemplary sub-frame assembly 20 with the vehicle's unibody. It should be appreciated that the vehicle could be any suitable type of automobile including, for example, a passenger car, a cross-over vehicle, a sport utility vehicle, a light duty truck, a bus, etc.

Referring still to FIG. 2, the sub-frame assembly 20 of the exemplary embodiment includes a pair of longitudinal members 24 which are constructed as generally mirror images of one another and are connected with one another via a single cross-member 26, which is discussed in further detail below. Each of the longitudinal members 24 extends in a longitudinal direction, which corresponds to the direction in which the vehicle extends, from a first end 28 to a distal second end 30. The longitudinal members 24 are spaced apart from one another in a lateral direction, which is perpendicular to the longitudinal direction, and at least partially converge towards one another such that the second ends 30 are closer to one another in the lateral direction than the first ends 28 are.

Each of the exemplary longitudinal members 24 also extends through a plurality of bends between the first ends 28 and second ends 30. More specifically, each longitudinal member 24 has a curve 32 which is spaced from its second end 30 and bends in a direction such that the portions of the longitudinal members 24 adjacent the second ends 30 extend in spaced and generally parallel relationship with one another while the remainders of the longitudinal tubes 24 (between the curves 32 and the first ends 28 of the longitudinal members 24) converge towards one another in the manner described above. Each of the exemplary longitudinal members 24 further includes a generally S-shaped curve 34 that bends in a vertical direction, which is perpendicular to the longitudinal and lateral directions, such that the first ends 28 of the longitudinal members 24 are vertically lower than the remainders of the longitudinal members 24 (between the S-shaped curves 34 and the second ends 30). In the exemplary embodiment, the longitudinal members 24 are generally tubular in shape. More precisely, the longitudinal members 24 of the exemplary embodiment have a generally rectangular shape with rounded corners when viewed in cross-section, and this shape extends generally continuously between the first and second ends 28, 30. However, it should be appreciated that the longitudinal members 24 could have any suitable tubular or non-tubular shape including, for example, a C-shape. It should also be appreciated that the bends in the longitudinal members 24 may depend on the geometrical constraints of the vehicle for which the sub-frame assembly 20 is designed.

As noted above, the exemplary sub-frame assembly 20 also includes a cross-member 26, or lateral member, which is attached to and extends in a lateral direction between the longitudinal members 24 to interconnect the longitudinal members 24. In the exemplary embodiment of the sub-frame assembly 20, the cross-member 26 extends between the second ends 30 of the longitudinal members 24. However, it should be appreciated that the cross-member 26 could alternately be spaced longitudinally from the second ends 30.

The second ends 30 of the longitudinal members 24 and the sides of the cross-member 26 are complementary in shape to provide for an improved connection between these components, i.e. to increase the contact area of the connection between these components. More particularly, a portion of either the second end 30 of each longitudinal member 24 or a portion of the cross-member 26 is shaped to receive the other. For example, in the exemplary embodiment of the sub-frame assembly 20, the sides of the cross-member 26 are shaped to engage the outer surfaces of the second ends 30 of the longitudinal members 24. As best shown in FIG. 2, in the exemplary embodiment of the sub-frame assembly 20, the cross member has an upper surface which is recessed vertically relative to the top surfaces of the longitudinal members 24, and the lower surface of the cross member is generally U-shaped. However, it should be appreciated that the cross member could have any suitable shape depending upon, among other things, the vehicular components to be supported by the sub-frame assembly 20 and the geometrical constraints of the vehicle.

The longitudinal members 24 and the cross-member 26 are preferably formed of steel, but may be of any desirable ferrous or non-ferrous metal; any combination of ferrous and non-ferrous metals including, for example, aluminum, magnesium, titanium, etc., or any suitable material. The longitudinal members 24 and cross-member 26 may be shaped through any desirable process or combination of processes including, for example, stamping, hydroforming, sheet metal roll forming, extrusion, machining, forging, etc. The materials and thicknesses of these components may depend on the specific application for which the sub-frame assembly 20 is designed. It should also be appreciated that the longitudinal members 24 and the cross-member 26 could be formed together as a single piece of material.

The cross-member 26 is preferably attached to the longitudinal members 24 through welding, e.g., gas-metal arc welding, laser beam welding, hybrid laser arc welding, induction welding, etc. However, it should be appreciated that the cross-member 26 may be attached to the longitudinal members 24 through any suitable process or combination of processes including, but not limited to, brazing, mechanical fasteners (such as fasteners or rivets) or adhesives.

The sub-frame assembly 20 of the exemplary embodiment is configured to support control arms of a pair of suspension assemblies for either the vehicle's front or back wheels. As such, the exemplary sub-frame assembly 20 includes a plurality of link brackets 36, or suspension attachment members, which are attached to the longitudinal members 24 for interconnecting the sub-frame assembly 20 with the control arms. In the exemplary embodiment, one link bracket 36 is disposed on the upper surface of each longitudinal member 24 at a location between the first and second ends 28, 30 and another link bracket 36 is disposed on the lower surface of each longitudinal member 24 vertically below the link bracket 36 on the upper surface, i.e. the link brackets 36 are generally longitudinally aligned with one another. The link brackets 36 are preferably shaped to conform to the outer surfaces of the longitudinal members 24 to increase the contact area between these components and improve the connection therebetween. The link brackets 36 are preferably attached to the longitudinal members 24 through the same process used to join the tubes 24 with the cross member, e.g. welding, brazing, mechanical fasteners (such as fasteners or rivets), adhesives, etc. However, it should be appreciated that any suitable joining process or joining means could alternately be employed.

Referring still to FIG. 2, each of the link brackets 36a on the longitudinal members 24 has a pair of side walls 38, an upper wall 40 and a back wall 42 to present an open interior which is accessible from only one side of the link bracket 36a. The side walls 38 have aligned apertures 44 for receiving, for example, a clevis pin (not shown) to attach the control arm with the sub-frame assembly 20.

The exemplary cross-member 26 also includes a pair of link brackets 36b formed integrally therewith and recessed vertically below the connections between the cross-member 26 and the longitudinal members 24. Alternately, the link brackets 36b could be added to the cross-member 26 rather than formed integrally therewith. The link brackets 36a, 36b on each side of the sub-frame assembly 20 cooperate with one another to allow the control arm or control arms to pivot about a longitudinally extending axis during operation of the vehicle.

Although the exemplary embodiment has a total of six link brackets 36a, 36b, it should be appreciated that the sub-frame assembly 20 may include any desirable number of link brackets, and they may take any desirable shape or may be located in any suitable place on the longitudinal members 24 or on the cross-member 26. It should also be appreciated that the sub-frame assembly 20 may include other features in addition to or in lieu of the link brackets 36a, 36b for coupling the sub-frame assembly 20 with, for example, an engine, a transmission, a differential, etc.

As discussed above, the sub-frame assembly 20 includes exactly three body mounts 22 for attaching the sub-frame assembly 20 to a unibody of a vehicle. More specifically, each of the longitudinal members 24 and the cross-member 26 has a single body mount 22. In the exemplary embodiment, the body mounts 22 on the longitudinal members 24 are disposed adjacent the first ends 28 such that these body mounts 22 are generally aligned with one another in the longitudinal direction, and the body mount 22 on the cross-member 26 is located approximately at a lateral midpoint of the cross-member 26. As such, when viewed from above, the body mounts 22 of the sub-frame assembly 20 are generally arranged in the shape of an isosceles triangle. Because the sub-frame assembly 20 has only three body mounts 22 rather than four or more as found in other known sub-frame assemblies 20, it may be more quickly and cost effectively attached to the unibody than the other known sub-frame assemblies. The generally triangular arrangement of the body mounts 22 provides for little or no loss in strength or durability as compared to conventional sub-frame assemblies. Removal and replacement is also easier because the sub-frame assembly 20 has only three body mounts 22. The sub-frame assembly 20 is also lighter, easier to handle and less costly to produce than the other known sub-frame assemblies 20.

Figure 3:
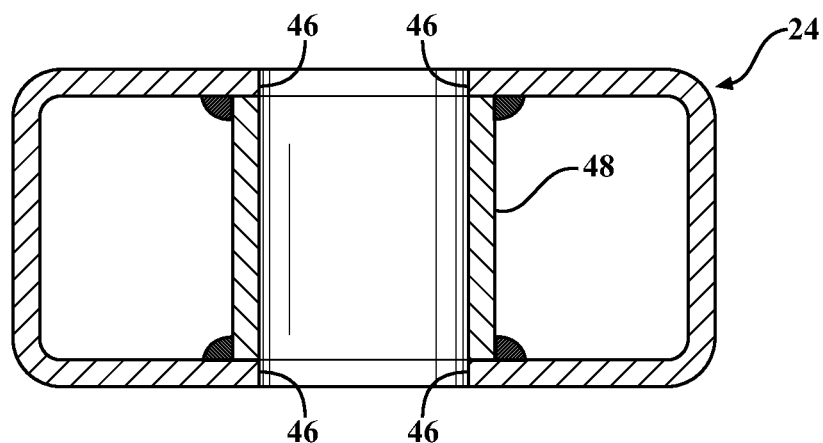
FIG. 3 is a cross-sectional view of a longitudinal member of the exemplary sub-frame assembly taken through line 3-3 of FIG. 2.
Figure 4:
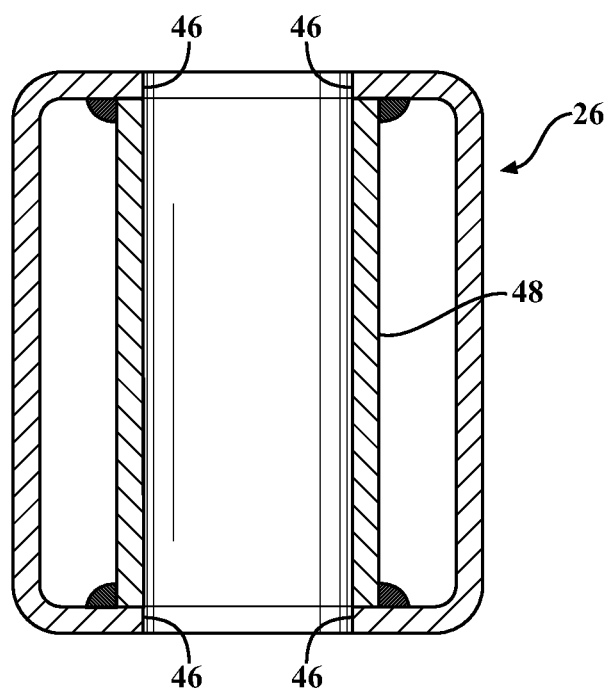
FIG. 4 is a cross-sectional view of a cross-member of the exemplary sub-frame assembly taken through line 4-4 of FIG. 2.

As best shown in FIGS. 3 and 4, at each body mount 22, the longitudinal members 24 and cross-member 26 includes a pair of openings 46 formed on opposite sides thereof, and a generally tubular sleeve 48 is disposed within the respective one of the longitudinal member 24 and cross-member 26 and extends between the openings 46 for receiving and guiding a bolt or any other type of fastener during the process of attaching the sub-frame assembly 20 to the unibody of the vehicle. The sleeves 48 also have the effect of resisting deformation of the longitudinal members 24 and the cross-member 26 during the process of connecting the sub-frame assembly 20 with the unibody and during operation of the vehicle. The sub-frame assembly 20 may either be hard mounted (without isolators) to the unibody or it may be isolated from the unibody with, for example, bushings.

The sub-frame assembly 20 may be located in any desirable place on the unibody including, for example, adjacent the front or the rear of the vehicle. Additionally, the sub-frame assembly 20 may be oriented such that the body mount 22 on the cross-member 26 is longitudinally forward or rearward of the body mounts 22 on the longitudinal members 24. As such, the sub-frame assembly 20 has a high versatility in that it may be located at different points of the unibody, may be oriented in different directions and may support a wide range of different vehicular components.

Obviously, many modifications and variations of the present invention are possible in light of the above teachings and may be practiced otherwise than as specifically described while within the scope of the appended claims.

The invention claimed is:

1. A sub-frame assembly for attachment to a unibody of a vehicle and for supporting at least one vehicular component, comprising:
   a pair of longitudinal members spaced from one another in a lateral direction and extending in a longitudinal direction from a free first end region to a second end region;
   said longitudinal members at least partially converging towards one another from said first end regions to said second end regions so that said second end regions are closer to one another than said first regions;
   a cross-member extending laterally between said longitudinal members;
   said sub-frame assembly has exactly three body mounts in total for connection with the unibody of the vehicle; and
   said free first end regions of said longitudinal members being spaced from one another by an open space.

2. The vehicle sub-frame assembly as set forth in claim 1 wherein said body mounts are arranged in a generally triangular pattern.

3. The vehicle sub-frame assembly as set forth in claim 1 wherein each of said body mounts includes a generally cylindrical sleeve which extends between aligned openings in said longitudinal members and said cross-member.

4. The vehicle sub-frame assembly as set forth in claim 1 wherein each of said longitudinal members and said cross-member has one or more of said body mounts.

5. The vehicle sub-frame assembly as set forth in claim 1 wherein said body mounts on said longitudinal members are located in said first regions of said longitudinal members.

6. The vehicle sub-frame assembly as set forth in claim 5 wherein said body mount on said cross-member is disposed at approximately a lateral mid-point of said cross-member.

7. The vehicle sub-frame assembly as set forth in claim 1 wherein said cross member extends between said closer second ends of said longitudinal members.

8. The vehicle sub-frame assembly as set forth in claim 1 further including at least one link bracket on each of said longitudinal members for attachment to at least one suspension component.

9. The vehicle sub-frame assembly as set forth in claim 8 wherein said at least one link bracket on each longitudinal member is further defined as a pair of link brackets with one link bracket being positioned on an upper surface of said longitudinal member and one link bracket being positioned on a lower surface of said longitudinal member.

10. The vehicle sub-frame assembly as set forth in claim 8 wherein said cross-member further includes a pair of link brackets.

11. The vehicle sub-frame assembly as set forth in claim 1 wherein said longitudinal members are generally tubular.

12. The vehicle sub-frame assembly as set forth in claim 1 wherein each of said longitudinal members has at least one bend and wherein portions of said longitudinal members extend in generally parallel and spaced relationship with one another.

13. The vehicle sub-frame assembly as set forth in claim 1 wherein said longitudinal members and said cross-member are at least partially shaped complementary to one another to enhance the connection therebetween.

14. The vehicle sub-frame assembly as set forth in claim 13 wherein said longitudinal members and said cross-member are made of metal.

15. The vehicle sub-frame assembly as set forth in claim 14 wherein said cross-member is formed as a separate element from said longitudinal members and is coupled to said longitudinal members.

* * * * *